US012601924B2

(12) United States Patent
Cagle et al.

(10) Patent No.: US 12,601,924 B2
(45) Date of Patent: Apr. 14, 2026

(54) ELECTRONIC DEVICE SECUREMENT STRAP

(71) Applicant: Apple Inc., Cupertino, CA (US)

(72) Inventors: John Cagle, San Jose, CA (US); Adam Y. Kollgaard, Bainbridge Island, WA (US); John S. Camp, Los Gatos, CA (US); Paul X. Wang, Cupertino, CA (US); Venkata Narayana Murthy Arelekatti, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/851,023

(22) PCT Filed: Apr. 26, 2023

(86) PCT No.: PCT/US2023/020043
§ 371 (c)(1),
(2) Date: Sep. 25, 2024

(87) PCT Pub. No.: WO2023/212097
PCT Pub. Date: Nov. 2, 2023

(65) Prior Publication Data
US 2025/0216686 A1     Jul. 3, 2025

Related U.S. Application Data

(60) Provisional application No. 63/363,682, filed on Apr. 27, 2022.

(51) Int. Cl.
*G02B 27/01* (2006.01)

(52) U.S. Cl.
CPC .. *G02B 27/0176* (2013.01); *G02B 2027/0152* (2013.01); *G02B 2027/0161* (2013.01)

(58) Field of Classification Search
None
See application file for complete search history.

(56) References Cited

U.S. PATENT DOCUMENTS

| | | | |
|---|---|---|---|
| 10,875,239 B2 * | 12/2020 | McCluskey | B33Y 70/00 |
| 12,061,339 B1 * | 8/2024 | Zimmerman | G06F 1/163 |
| 2004/0061663 A1 * | 4/2004 | Reynolds | G02B 27/0176 348/E13.041 |
| 2018/0364491 A1 * | 12/2018 | Park | G02B 27/0176 |
| 2021/0356750 A1 * | 11/2021 | Shin | G02B 27/0176 |
| 2022/0026724 A1 * | 1/2022 | Law | G02B 27/0176 |

FOREIGN PATENT DOCUMENTS

| | | | | |
|---|---|---|---|---|
| WO | WO-2019135210 A1 * | 7/2019 | | G02B 27/0176 |
| WO | WO-2021137766 A1 * | 7/2021 | | G06F 1/1656 |

OTHER PUBLICATIONS

PCT International Search Report and Written Opinion for PCT International Application No. PCT/US2023/020043, filed Aug. 10, 2023.

* cited by examiner

*Primary Examiner* — Dorothy Harris
(74) *Attorney, Agent, or Firm* — Dorsey & Whitney LLP

(57) ABSTRACT

A securement band for a head-mountable device can include a variable length strap, a first load spreader connected to the variable length strap, and a second load spreader connected to and separated from the first load spreader by the variable length strap. The first and second load spreaders can be fixed in length. The variable length strap can include elastic material and the first and second load spreaders can be rigid.

19 Claims, 12 Drawing Sheets

ELECTRONIC DEVICE SECUREMENT STRAP

CROSS-REFERENCE TO RELATED APPLICATION(S)

This application is a national stage filing based off of PCT Application No. PCT/US2023/020043, filed Apr. 26, 2023, and entitled "ELECTRONIC DEVICE SECUREMENT STRAP" which claims priority to U.S. Provisional Patent Application No. 63/363,682, filed 27 Apr. 2022, and entitled "ELECTRONIC DEVICE SECUREMENT STRAP," the entire disclosures of which are hereby incorporated by reference.

FIELD

The described embodiments relate generally to securement devices. More particularly, the present embodiments relate to securement devices for wearable electronic devices.

BACKGROUND

Recent advances in portable computing have enabled head-mountable devices that provide augmented and virtual reality (AR/VR) experiences to users. Various component of these devices, such as display screens, viewing frames, securement straps, speakers, batteries, and other components, operate together to provide an immersive experience. These various components contribute to the weight of the device, which must be secured to the user's head during use. Typically, securement straps, bands, arms, or other securement mechanisms connected to the display component of the device can extend at least partially around the user's head and exert a force inward against the head to secure the display in front of the user's eyes. These securement straps exert enough force to press the display against the user's face, including against the user's cheeks, nose, and forehead, to secure the display in front of the user's eyes and maintain that position during use while the user may move around or jostle the device.

During periods of extended use, for example while watching a movie or playing a game with the head-mountable device for minutes or hours at a time, the force exerted by the securement mechanism, and thus by the display component against the face of the user, can become uncomfortable. Forces applied to the user by the device, especially on the front of the user's head/face and the back of the user's head, where the securement strap or other securement mechanism produces the force of the display component on the face, can create uneven pressure concentrations that can exacerbate the discomfort of the user.

Accordingly, what is needed in the art are devices and systems for securing wearable electronic devices, including head-mountable devices, to a user without causing discomfort and pain with extended use.

SUMMARY

In one example of the present disclosure, a securement band for a head-mountable device can include a variable length strap, a first load spreader connected to the variable length strap, and a second load spreader connected to and separated from the first load spreader by the variable length strap. The first and second load spreaders can be fixed in length. The variable length strap can include elastic material and the first and second load spreaders can be rigid.

In one example, the variable length strap can include multiple sections with one of the multiple sections extending between the first load spreader and the second load spreader. In one example, the first load spreader can include a housing defining an internal volume and a concave curved surface. In one example, the securement band can further include an electronic component disposed within the internal volume. In one example, the securement band can further include an elastic buffer disposed on the concave curved surface. In one example, the elastic buffer can include foam. In one example, the elastic buffer can include a fluid-filled bladder. In one example, the variable length strap can include an elastic material. In one example, the first load spreader and the second load spreader are more rigid than the variable length strap.

In at least one example of the present disclosure, a head-mountable device can include a display component and a securement band connected to the display component. The securement band can include a first load spreader, a second load spreader, and a first elastic portion connecting and separating the first load spreader and the second load spreader.

In one example, the first load spreader and the second load spreader each include a curved surface configured to conform to a head. In one example, the first load spreader can be configured to press against a left side of a user's head and the second load spreader can be configured to press against a right side of a user's head when the user dons the head-mountable device. In one example, the head-mountable device can further include a third load spreader disposed between the first load spreader and the second load spreader along a length of the securement band and a second elastic portion connecting and separating the second load spreader and the third load spreader. In one example, the first load spreader can define a first concave curved surface, the second load spreader can define a second concave curved surface, and the third load spreader can define a third concave curved surface having a curvature different than a curvature of the first concave curved surface and the second concave curved surface. In one example, the third load spreader can be configured to press against a rear of the user's head when the user dons the head-mountable device.

In at least one example of the present disclosure, a load spreader can include a body defining a concave curved surface and a strap engagement feature configured to connect the load spreader to a securement band of a wearable electronic device.

In one example, the concave curved surface can include a curvature configured to conform to a head. In one example, the body can include a housing defining an internal volume. In one example, the load spreader can further include an electronic component disposed in the internal volume.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
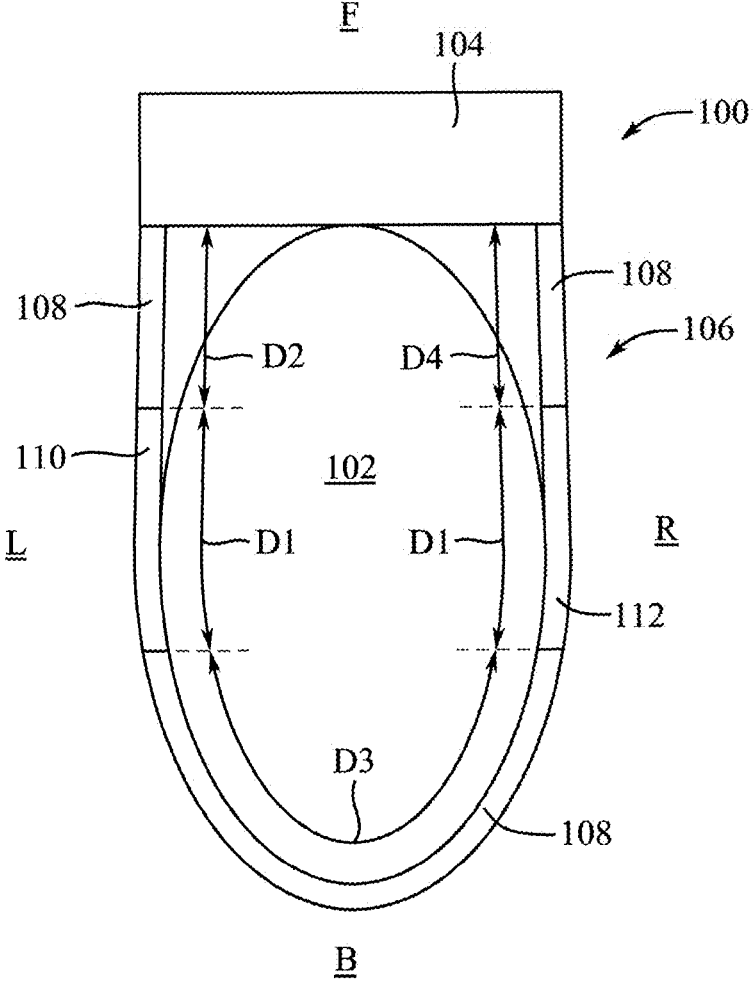
FIG. 1 shows a top view of an example of a head-mountable device worn on the head of a user.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to securement devices and systems. More particularly, the following disclosure relates to securement devices for securing wearable electronic devices to a user. In one example, the wearable electronic device can include a head-mountable device, such as an AR/VR device with a display component to be secured to the face of the user. However, the devices and systems described herein are not limited to head-mountable devices. For example, securement straps and devices described herein can be used to secure any wearable device, including wearable electronic devices, to the body of a user. Other devices can include wrist watches, arm bands including fitness trackers, medical devices such as heart rate monitors or other devices worn by a user.

In a particular embodiment a head-mountable display includes a display component and a securement band that reduces the pressure concentrations and more evenly distributes pressures experienced by the user around the user's head. In one example, the securement band is connected to the display component and extends at least partially around a user's head to exert an inward pressure on the head to maintain the position of the display component on the user's face in front of the user's eyes. The display component, which may include a substantial portion of the weight of the head-mountable device, is thus pressed against the cheeks, nose, and forehead of the user with enough force to maintain its position during use, which can often include jostling of the device as the user moves around or changes positions. Because the display component is positioned on the front of the user's head, the counterforce provided by the securement band is naturally focused on the opposite rear side of the user's head.

However, securement bands of the present disclosure include load spreaders integrated with or connected by the securement band that shifts the load from the front and rear of the user's head to the left and right side of the user's head. In this way, the front and rear of the user's head is relieved of carrying the full force of the pressure exerted by the securement band. In one example, the load spreaders of the securement band include bodies more rigid than other connecting portions of the securement band such that forces acting inward on the side of the user's head through each load spreader is dispersed along an entire contact area between the load spreader and the head.

In one example, the portions of the securement bands described herein extending between and connecting the various load spreaders are variable length portions of the band used for adjustability. In one example, the variable length portions can include crank or ratchet mechanisms adjustable by the user to customize the total length of the securement band and the positions of the various load spreaders. The load spreaders, in contrast, can be fixed in length and can include rigid bodies, as noted above, to spread out the load applied to the user's head. In one example, the variable length portions of the securement bands described herein include elastic material portions extending between and connecting the various more rigid load spreaders. The elastic material can be stretched while donning and doffing the device and provide the inward forces of the securement band surrounding the head, including inward forces of the load spreaders against the head.

In addition, as noted above, the head-mountable device can include a number of electronic components functioning together during use, including speakers, batteries, logic boards and circuitry components, antennas, and so forth. Any one or more of these components can be incorporated into the load spreaders, and electrically connected to each other and/or to the display component of the device, such that weight from those components can be distributed around the user's head, rather than concentrated where the display component presses against the front face of the user. In this way, the devices and systems described herein can allow a user to don head-mountable devices or other wearable electronic devices for long periods of time without experiencing pain or discomfort.

These and other embodiments are discussed below with reference to FIGS. 1-12B. However, those skilled in the art will readily appreciate that the detailed description given herein with respect to these Figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 shows a top view of a user donning an example of a head-mountable device 100, including a securement band 106 securing a display component 104 to the head 102. The device 100 includes a variable length strap 108, a first load spreader 110 connected to the variable length strap 108, and a second load spreader 112 connected to, and separated from, the first load spreader 110 by the variable length strap 108. In at least one example, the first and second load spreaders 110, 112 are fixed in length and/or rigid. The securement band 106 can include a total length representing a longitudinal length of the band following its curvature around the head 102. In the illustrated example of FIG. 1, the securement band 106 can have a total length including the sum of its parts, including lengths $D_1$-$D_4$ as shown. In one example, the load spreaders 110, 112 include a fixed length representing the length of the rigid body of the load spreader 110, 112 extending along a side of the user's head 102. In the illustrated example of FIG. 1, each load spreader 110, 112 can be the same length $D_1$. However, other examples of load spreaders described herein are not limited as such.

In at least one example, the securement band 106 can include one or more variable length straps 108, with one example having multiple sections, as shown in FIG. 1, with each section extending between, connecting, and thus separating the load spreaders 110, 112 as well as securing to the display component 104. In one example, each section of the variable length strap 108 can be changed in length. In the illustrated example of FIG. 1, a first section of the variable length strap 108 includes a first length $D_2$, a second section of the strap 108 includes a second length $D_3$, and a third section of the strap 108 includes a fourth length $D_4$. Each of these lengths $D_2$-$D_3$ can be changed or adjusted by the user during use. In one example, one or more of the sections of the variable length straps 108 can include multiple sections of rigid material connected together via a ratchet or dial tensioning mechanism. In one example, the variable length strap 108 can include an elastic material that stretches when acted upon by the user, for example during donning and doffing of the head-mountable device 100. The elastic material of the variable length strap 108 can include elastic polymers, knitted fabrics, or one or more other elastic materials configured to function as a component that returns to shape or length after being deformed. In one example, the variable length strap 108 is not rigid or flexible. Conversely, the load spreaders 110, 112 can be formed to be rigid, inflexible, and/or stiff such that the load spreaders 110, 112 are fixed in length.

The terms "elastic," "not rigid," or "flexible" used herein when describing to components and materials refers to materials and components that are purposely elastic as a functioning feature. That is, a component or material that is "elastic," "not rigid," or "flexible" is deformable and returns to shape, length, or original form when not acted upon, such that the deformation and return to form of the component or material is a useful or advantageous feature of the component or material as described herein. In contrast, the terms "plastic," "rigid," or "inflexible" used herein to describe components and materials are those components and materials whose proper functioning depends on their maintaining shape or form under forces that would cause the "elastic" or "non-rigid" components and materials to deform in order to perform their proper function. While a "plastic" material or component may theoretically be deformable to a certain degree, for example a negligible degree, and still return to form, the term "plastic" or "rigid" used herein refers to components and materials that are not meant to deform plastically as part of their advantageous functioning but may under some conditions deform.

In one example, the first and second load spreaders 110, 112 include rigid bodies, shapes, and/or materials such that the first and second load spreaders 110, 112 are more rigid than the variable length strap 108 or sections thereof. In one example, the load spreaders 110, 112 are more rigid than the elastic material of the variable length strap 108.

As shown in the illustrated example of FIG. 1, the first load spreader 110 can be configured to press against a left side of a user's head 102 and the second load spreader 112 can be configured to press against a right side of the user's head 102 when the user dons the head-mountable device

100. The variable length strap 108 can thus urge the more rigid, fixed length load spreaders 110, 112 inward against the head 102 as the user dons the device 100. At least in part because the load spreaders 110, 112 are rigid, the force from the variable length strap 108 transfers through the load spreaders 110, 112 and distributes along the total contact area between each spreader 110, 112 and the head 102.

Also, for reference throughout the present disclosure, FIG. 1 illustrates an orientation of the user's head 102 including a front F, back or rear B, left L, and right R side of the head. For purposes of clarity, this orientation shown of the user's head 102 in FIG. 1 is similar to other figures shown and described herein when illustrating a top view of a user's head 102.

Any of the features, components, and/or parts, including the arrangements and configurations thereof shown in FIG. 1 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 1.

Figure 2:
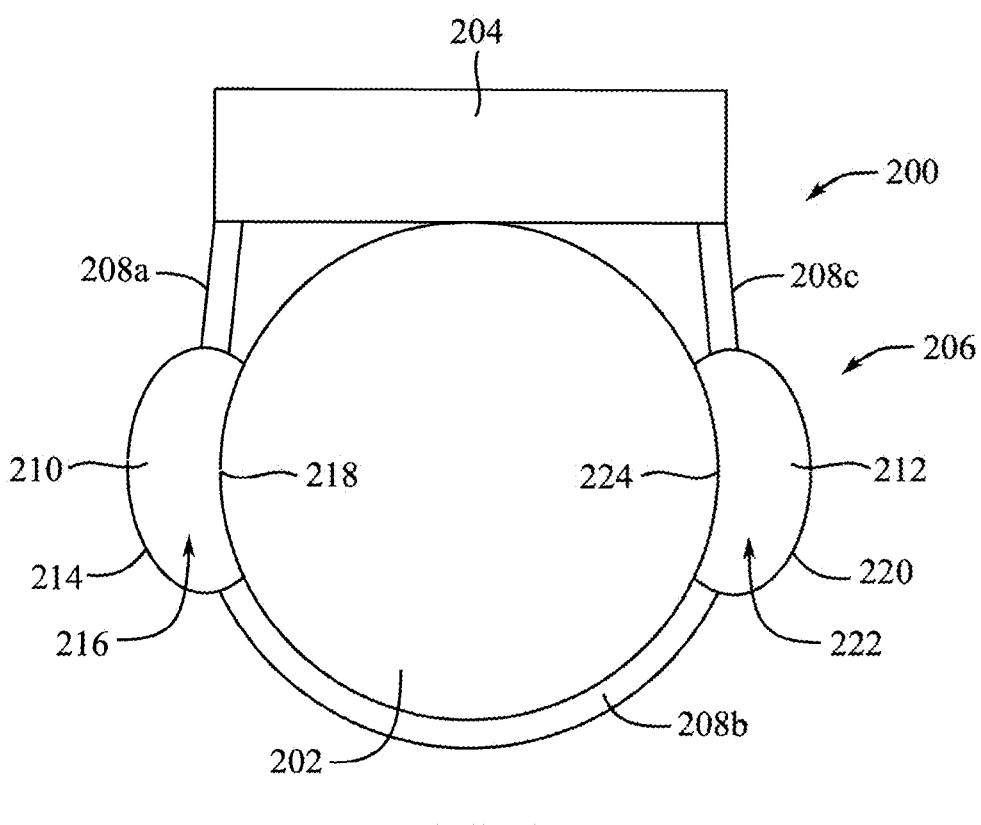
FIG. 2 shows a top view of an example of a head-mountable device worn on the head of a user.

FIG. 2 shows a top view of another example of a head-mountable device 200, including a securement band 206 securing a display component 204 to the head 202 of the user. The securement band 206 can include separate variable length sections 208a, 208b, and 208c, which can be referred to together as the variable length strap 208. The first section 208a can extend between the first load spreader 210 and the display component. The second section 208b can extend between the first and second load spreaders 110, 112, and the third section 208c can extend between the second load spreader 112 and the display component 204.

In addition, in at least one example, the first load spreader can include a housing 214 defining an internal volume 216 and a concave outer surface 218 configured to conform to the curvature of the head 202. Likewise, the second load spreader 212 can include a housing 220 defining an internal volume 222 and a concave outer surface 224 conforming to the user's head 202.

The shape, dimensions, materials, configuration, volume of the internal volumes 216, 222, and contours of the outer surfaces of the load spreaders 210, 212, including the concave surfaces 218, 224, respectively, can vary from one example to another. The concave surfaces 218, 224, for example, can vary to accommodate different curvatures of different user heads. In one or more examples, each load spreader 210, 212 can be altered or adjusted to change the curvature of the concave surface 218, 224 to customize the shape and fit of each load spreader to the user's head.

In at least one example, the position of each load spreader 210, 212 relative to the user's head or other anatomical feature including the user's ears, can be adjusted for customized fitting. User preferences regarding comfort and preferred load spreader positioning may vary. In one example, the total length of each section 208a-c of the variable length strap 208 can be adjusted to change the position of one or more of the load spreaders 210, 212. In one example, the resting length of each section 208a-b of the variable length strap 208, meaning the length at which each section 208a-b defaults to under no force or alteration from the user, can be adjusted to alter the position of each load spreader 210, 212 around the user's head 202.

The curvature of the concave surface 218, 224, of the load spreaders 210, 212, respectively, can be curved to match the curvature of the head where the load spreader 210, 212 comes into contact with the head 202. In this way, a surface area contact between each load spreader 210, 212 and the head 202 can be maximized such that the forces acting inwardly on the head 202 from the securement band 206 can be evenly dispersed through the entire contact area, thus reducing the force felt at any one point by the head 202.

Any of the features, components, and/or parts, including the arrangements and configurations thereof shown in FIG. 2 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 2.

Figure 3:
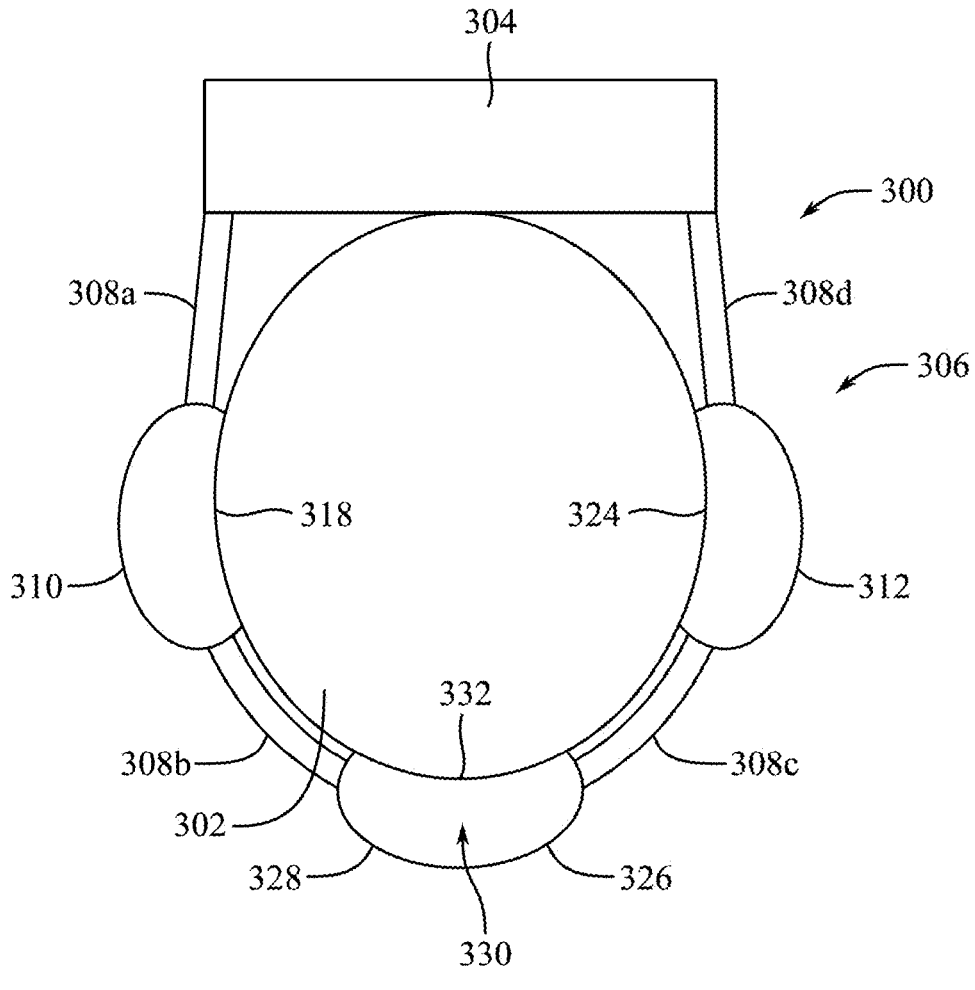
FIG. 3 shows a top view of an example of a head-mountable device worn on the head of a user.

FIG. 3 shows another example of a wearable device, such as a head-mountable device 300, including a securement band 306 disposed around a user's head 302 and securing a display component 304 to the front of the user's head 302 over the eyes. The securement band can connect the display component 304 and include a first load spreader 310, a second load spreader 312, and a third load spreader 326. The third load spreader 326 can include a housing 328 defining an exterior concave curved surface 332 and an internal volume 330. The third load spreader 326 can include a rigid material or construction. In at least one example, the third load spreader 326 is fixed in shape, length, or form, and/or more rigid than one or more elastic/variable length portions 308*a*, 308*b*, 308*c*, and 308*d* of the securement band 306.

The first section 308*a* of the securement band 306 can extend between and connect the first load spreader 310 to the display component. The second section 308*b* of the securement band 306 can extend between and connect the first load spreader 310 to the third load spreader 326. The third section 308*c* of the securement band 308*d* can extend between and connect the third load spreader 326 and the second load spreader 312. The fourth section 308*d* of the securement band 306 can extend between and connect the second load spreader 312 and the display component 304. Each section 308*a-d* of the securement band 306 can be referred to as an elastic portion and can include variable length construction and/or elastic materials.

The securement band 306 can include the various variable length sections 308*a-d* that urge the load spreaders 310, 312, and 326 against the left, right, and rear of the head 302, respectively, as shown in FIG. 3, such that the forces applied to the user's head by the securement band 308 are spread out by the total contact area between the first, second, and third load spreaders 310, 312, 326 and the head 302. The concave curved surface 332 defined by the housing 328 of the third load spreader 326 can be different than the concave curved surfaces 318, 324 of the first and second load spreaders 310, 312, respectively, to fit the curvature of the rear side of the user's head 302, which may be different than the curvatures of the left and right sides of the head 302.

In at least one example, the first and second load spreaders 310, 312 in particular relieve some of the pressure that would otherwise be exerted on the rear of the head by the third load spreader (or that area of the securement band 306 absent the third load spreader 326) and exerts it onto the left and right sides of the user's head 302. In this way, the load spreaders 310, 312 can disperse the total load so that the maximum force felt by the user from the securement band 306 is lessened.

Any of the features, components, and/or parts, including the arrangements and configurations thereof shown in FIG. 3 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 3.

Figure 4:
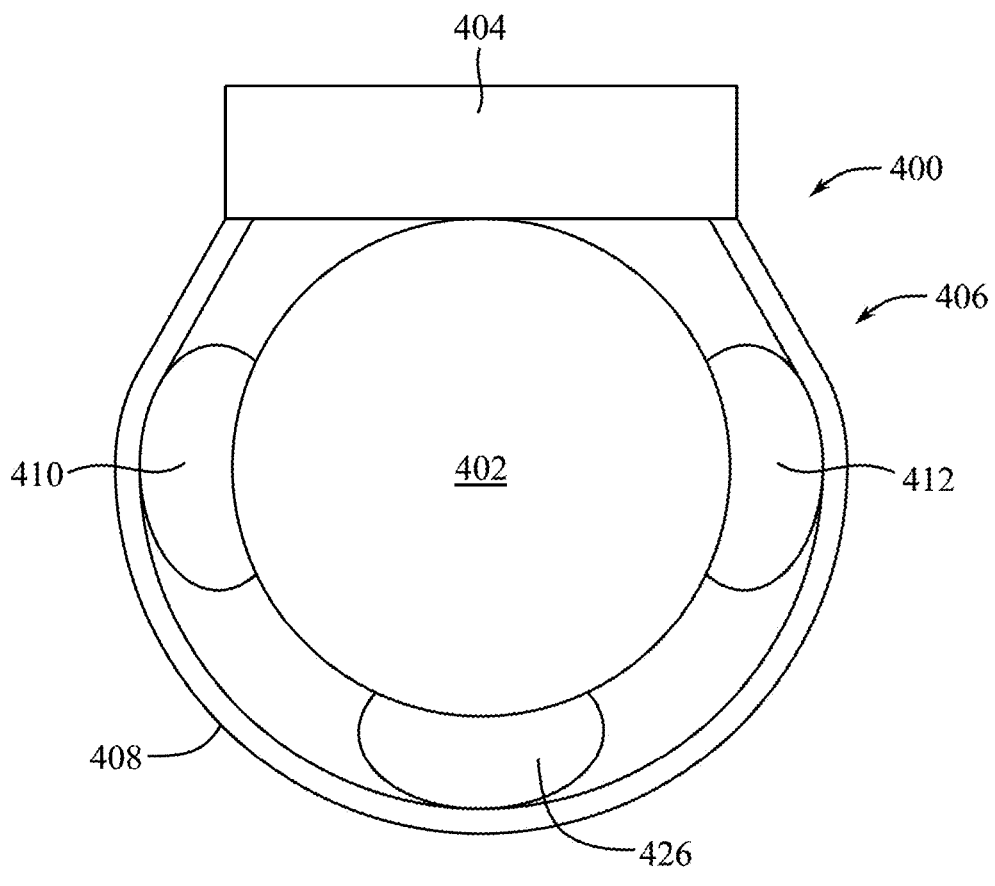
FIG. 4 shows a top view of an example of a head-mountable device worn on the head of a user.

FIG. 4 shows an example of a wearable electronic device 400 secured to a user's head 402, including a head-mountable display 404 secured via a securement band 406. The securement band can include one or more spreaders, including a first load spreader 410 configured to press against the left side of the user's head 402, a second load spreader 412 configured to press against the right side of the user's head 402, and a third load spreader 426 configured to press against the rear side of the user's head 402.

In addition, the securement band 406 can include a variable length strap 408 including a single piece or part extending around the user's head 402 and pressing each load spreader 410, 412, and 426 against the user's head 402. In such an example, rather than multiple distinct sections of the strap 408, a single strap 408 can extend around the user's head 402 and be connected to each load spreader 410, 412, 426 such that the strap 408 extends between, is connected to, and separates each load spreader 410, 412, 426. Each load spreader 410, 412, 426 can be secured to the strap 408 using one or more attachment mechanisms, including being adhered via an adhesive, co-molded with the strap 408, or buttons, snaps, clips, hook-and-loop mechanisms, or the like. In one example, one or more of the load spreaders 410, 412, 426 can be adjustably secured to the strap 408 such that each load spreader 410, 412, 426 can be adjusted in position along a length of the strap 408 to accommodate various head shapes and curvatures.

Any of the features, components, and/or parts, including the arrangements and configurations thereof shown in FIG. 4 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 4.

Figure 5:
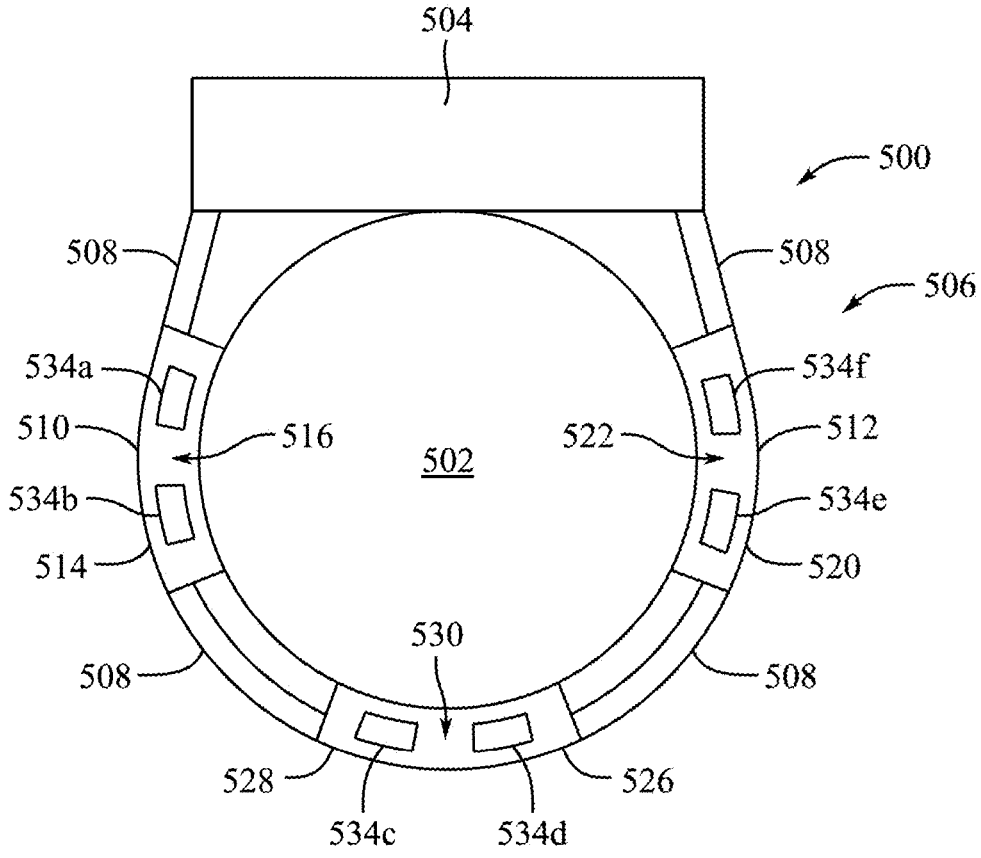
FIG. 5 shows a top view of an example of a head-mountable device worn on the head of a user.

FIG. 5 shows another top view of a user donning an electronic device 500 on his or her head 502 including a securement band 506 extending around the head 502 to hold the display component 504 against the face of the user in front of the eyes. In the illustrated example, the securement band 506 includes a variable length strap 508, or multiple sections thereof, extending between first, second, and third load spreaders 510, 512, and 526, respectively. The first load spreader 510 can include a housing 514 defining an internal volume 516. The second load spreader 512 can include a housing 520 defining an internal volume 522. The third load spreader 526 can include a housing 528 defining an internal volume 530.

In at least one example, one or more electronic components 534*a-f* can be disposed in the internal volumes 516, 522, 530 of the load spreaders 510, 512, 526. The various electronic components 534*a-f* can collectively be referred to as electronic components 5334. The illustrated example shows two electronic components 534 disposed in the internal volumes 516, 522, 530 of the load spreaders 510, 512,

526 but more or less than two electronic components 534 can be disposed in the load spreaders 510, 512, 526 in one or more other examples. For purposes of explanation, the electronic components 534*a*, 534*b* in the internal volume 516 of the first load spreader 510 will be referenced, while the same description can be applied to the various electronic components 534*c-f* disposed in the internal volumes 522, 530 of the second and third load spreaders 512, 516.

As noted above, the first load spreader 510 can include a housing 514 defining an internal volume 516 with electronic components 534*a* and 534*b* disposed therein. In at least one example, the electronic components 534 can be any components configured to operate the device 100. These components 534 can include, for example, batteries, processors, speakers, circuit boards and components thereof, electrical wiring, antennas, and so forth. The electronic components 534 can be electrically coupled with one or more components of the display component 504, including display screens, speakers, lights, and the like. The electronic components 534 disposed in the load spreader 510 can be electrically coupled to the display component 504 via one or more wires, flexes, or other electrically conductive pathways extending from the first load spreader 510 to the display component 504. In one example, electrical wired extend through the variable length strap 508 to connect the electronic components 534 to the display component 504.

Additionally, or alternatively, in one or more other examples, the electronic components 534 of the load spreader 510 can electrically communicate with the display component 504, or components thereof, via wireless communication between transmitters/receivers in the load spreader 510 and the display component 504. These same methods of electrically coupling electronic components 534 of the load spreader 510 and the display component 504 can also be applied to the other electronic components 534 disposed in the other load spreaders 512, 526. In addition, the electronic components 534 from one load spreader 510, 512, 526 can be electrically coupled to other electronic components 534 in other load spreaders 510, 512, 526 in similar ways, for example wires extending through the variable length strap 508 and/or wireless communication therebetween.

In at least one example, one or more of the electronic components 534 of the load spreaders 510, 512, 526 can be disposed on an external surface or in a position other than within the internal volumes 516, 522, 530 thereof. In one example, housings 514, 520, 528 of the load spreaders 510, 512, 526, respectively, can define one or more apertures configured to allow electronic components 534 to communicate with an external environment, for example sensors, or speakers sending sound waves through the aperture(s), microphones receiving external sound waves through the aperture(s), and the like.

Any of the features, components, and/or parts, including the arrangements and configurations thereof shown in FIG. 5 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 5.

Figure 6A:
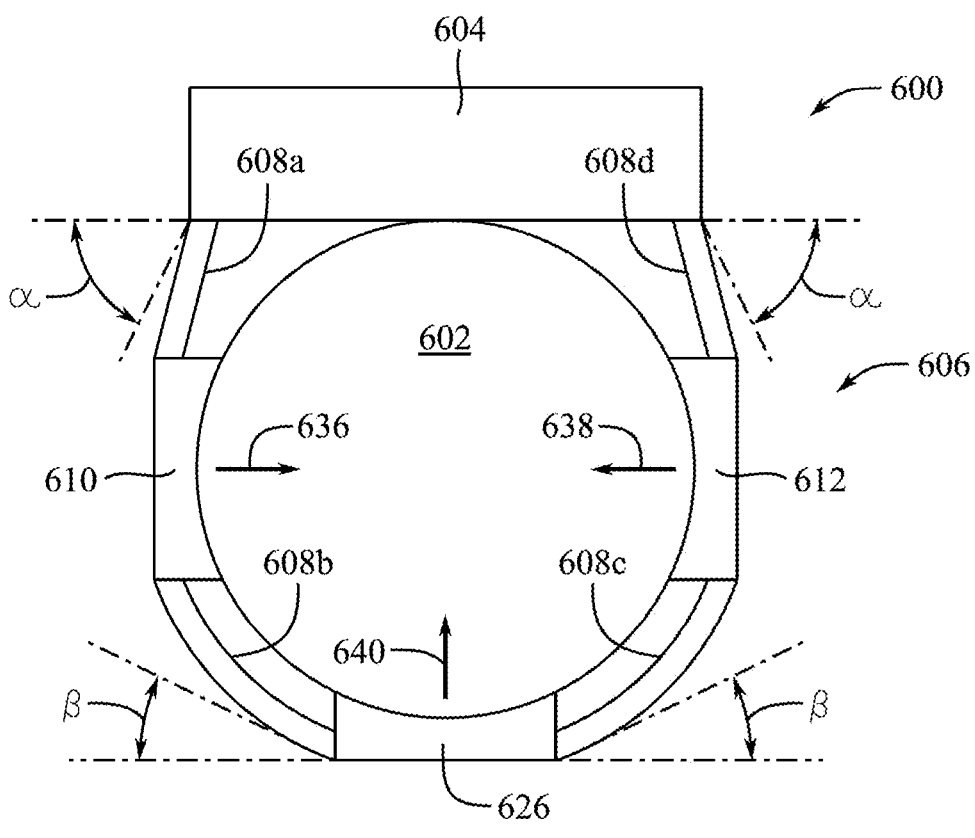
FIG. 6 shows a top view of an example of a head-mountable device worn on the head of a user.
Figure 6B:
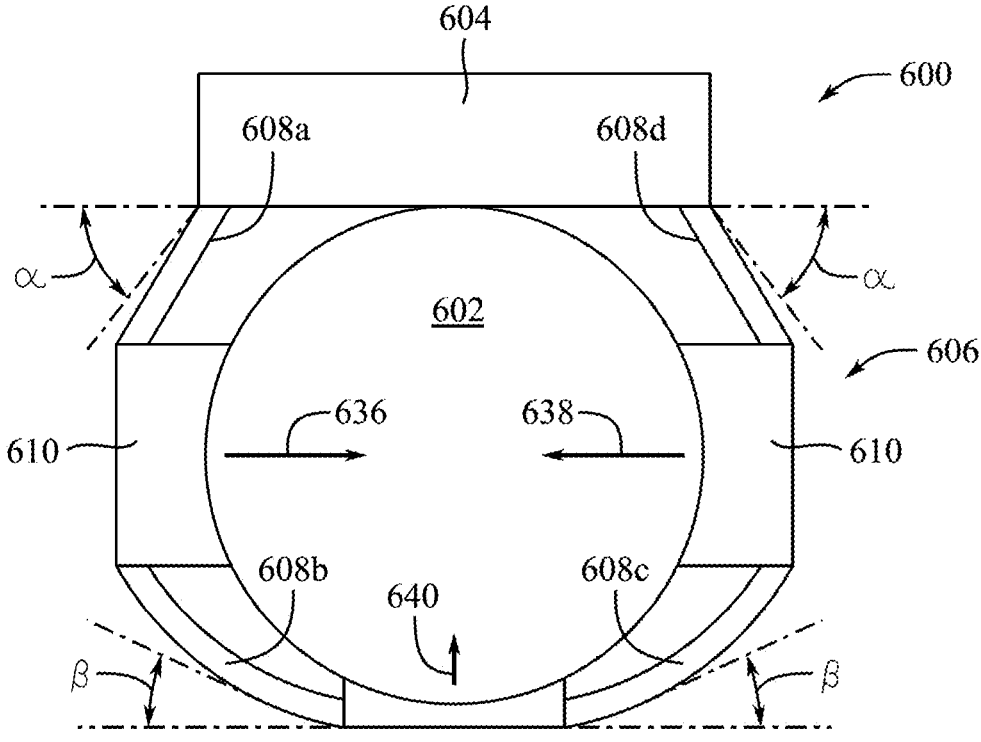

FIGS. 6A and 6B show another example of a wearable electronic device 600 secured to the head 602 of a user, including a securement band 606 securing a display component 604 of a head-mountable device 600 or display to the head 602. The securement band 606 can include a variable length strap 608 including sections 608*a-d* extending between various load spreaders 610, 612, 626 and between load spreaders 610, 612 and the display component 604. The variable length strap 608 applies in inward force urging the load spreaders 610, 612, 626 inward toward the head 602 to secure the device 600 thereto. As shown, the first load spreader 610 applies a first force 636 inward on the left side of the head 602 counteracting a second force 638 from the second load spreader 612 acting on the right side of the head 602. The third load spreader 626 can create a third force 640 inward on the head to counteract the force from the display component 604 on the front of the head 602.

Each of these forces 636, 638, 640 from the load spreaders 610, 612, 626 can vary in magnitude but are shown as generally similar in magnitude in FIG. 6A as indicated by the length of the referenced arrows. The forces 636, 638, 640 are not limited as such but are shown this way for purposes of explanation and in contrast to the varying force magnitudes shown in FIG. 6B. With continued reference to FIG. 6A, strap angles $\beta$ extending outward from the third load spreader 626 disposed against the rear side of the user's head 602 describe the angle at which the strap sections 608*b* and 608*c* extend away from the third load spreader 626. The two opposing strap angles $\beta$ are shown as the same or similar in magnitude but can be different in one or more other examples. As the strap angle $\beta$ decreases, the force 640 exerted on the rear of the user's head 602 also decreases based on the vector direction of the strap sections 608*b* and 608*c* extending from the third load spreader 626, and vice versa.

FIG. 6A also shows strap angles $\alpha$ representing the angle at which the strap sections 608*a* and 608*d* extend away from the display component 604. Again, these strap angles $\alpha$ are shown as the same or similar from the left to the right side of the head 602 but can vary in one or more other examples. As the strap angle $\alpha$ decreases, the force applied to the face of the user from the display component 604 on the front of the head 602 decreases, and vice versa.

The size or shape of the first and second load spreaders 610, 612 exerting pressure on the left and right side of the user's head 602, respectively, determines, at least in part, the strap angles $\alpha$ and $\beta$. Thus, in one or more examples, the first and second load spreaders 610, 612 can be configured to decrease the strap angles $\alpha$ and $\beta$ and shift some of the pressures exerted on the front and rear of the head 602, including force 640, to the left and right sides of the head 602. FIG. 6B illustrates this concept with first and second load spreaders 610, 612 being larger or extending laterally further away from the head 602 to decrease the strap angles $\alpha$ and $\beta$. As shown, this increases the first and second forces 636, 638 on the sides of the head 602 while decreasing the third force 640 from the third load spreader 626, and thus the opposing force on the front of the head 602 or face from display component 604 positioned opposite the third load spreader 626.

Accordingly, the size, shape, position, and configuration of each load spreader 610, 612, 626 can be designed to shift and re-distribute forces from securement band 606 acting on the user's head 602. In particular, the first and second load spreaders 610, 612 can be configured to relieve pressure and forces acting on the front of the head 602 and face of the user from the display component of the wearable device 600 such that the user can wear the device 600 for extended periods of time while minimizing or eliminating discomfort and pain.

Any of the features, components, and/or parts, including the arrangements and configurations thereof shown in FIGS. 6A-6B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 6A-6B.

Figure 7:
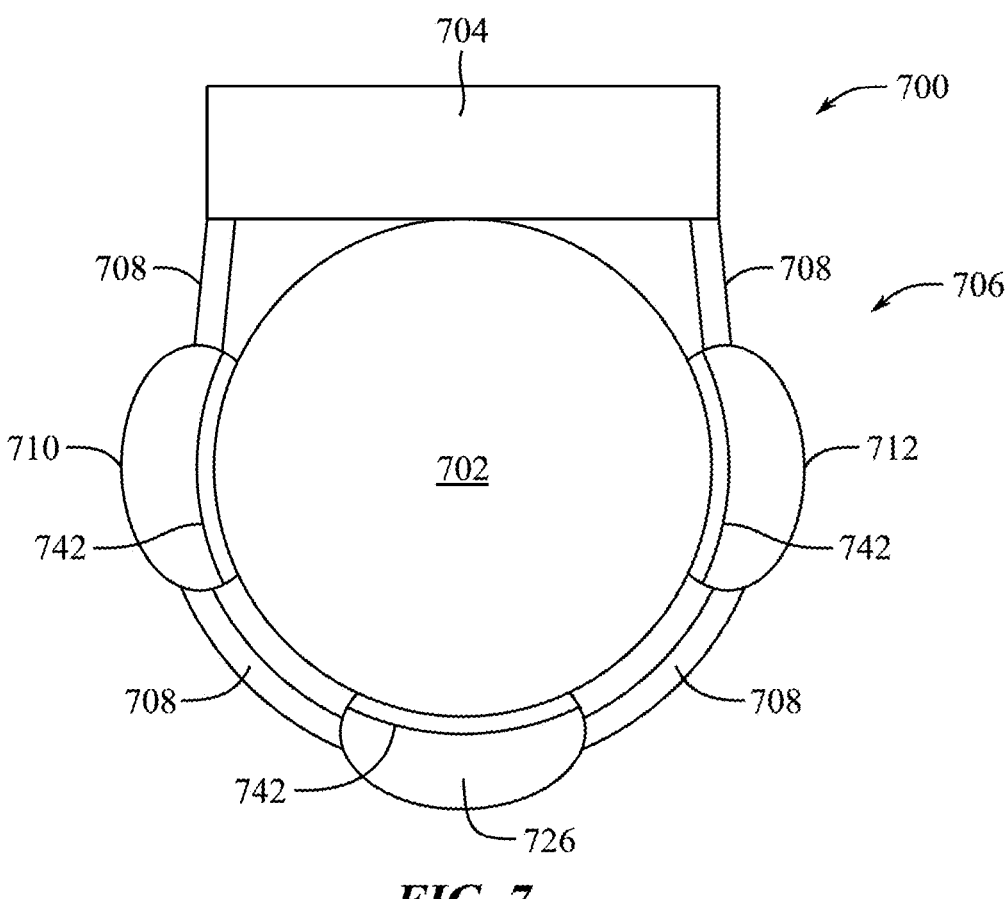
FIG. 7 shows a top view of an example of a head-mountable device worn on the head of a user.

FIG. 7 shows another example of a wearable electronic device 700 secured to the head 702 of a user, including a securement band 706 securing a display component 704 of a head-mountable device 700 or display to the head 702. The securement band 706 can include a variable length strap 708 including section extending between various load spreaders 710, 712, 726 and between load spreaders 710, 712 and the display component 704. The variable length strap 708 applies in inward force urging the load spreaders 710, 712, 726 inward toward the head 702 to secure the device 700 thereto.

In at least one example, one or more of each of the load spreaders 710, 712, 726 can have an elastic buffer 742 disposed on an outer concave surface between the load spreader 710, 712, 726 and the head 702. The elastic buffer can include a foam material, for example, and/or a fluid-filled bladder, which may disperse any pressure concentrations arising from variations in the curvature of the user's head 702 with the curvature of the rigid load spreaders 710, 712, 726. One or more other elastic or cushioning materials or configuration can also be included with the buffers 742 shown in FIG. 7.

Any of the features, components, and/or parts, including the arrangements and configurations thereof shown in FIG. 7 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 7.

Figure 8:
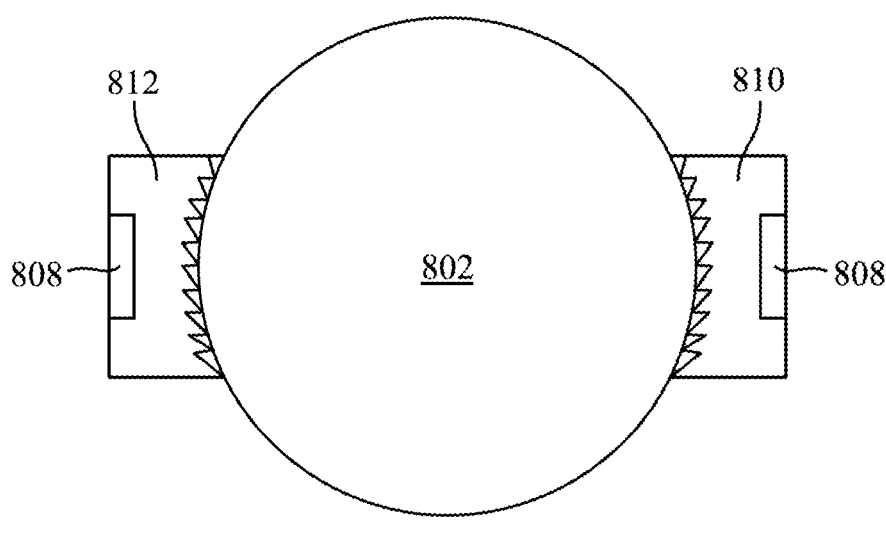
FIG. 8 shows a front view of an example of a head-mountable device worn on the head of a user.

FIG. 8 shows a front cross-sectional view of a user's head 802 with first and second load spreaders 810, 812 pressed against the sides of the head 802 by the strap 808. In the illustrated example, the load spreaders 810, 812 can include features urging the load spreaders 810, 812 upward and preventing the downward sliding off the load spreaders 810, 812 over time due to gravity counteracting the friction holding the device onto the user's head 802. In at least one example, as shown in FIG. 8, these upward urging features can include directional teeth or protrusions. In one or more other examples, the features can include high-friction materials or coating on the inner surface of the load spreaders 810, 812.

Any of the features, components, and/or parts, including the arrangements and configurations thereof shown in FIG. 8 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 8.

Figure 9:
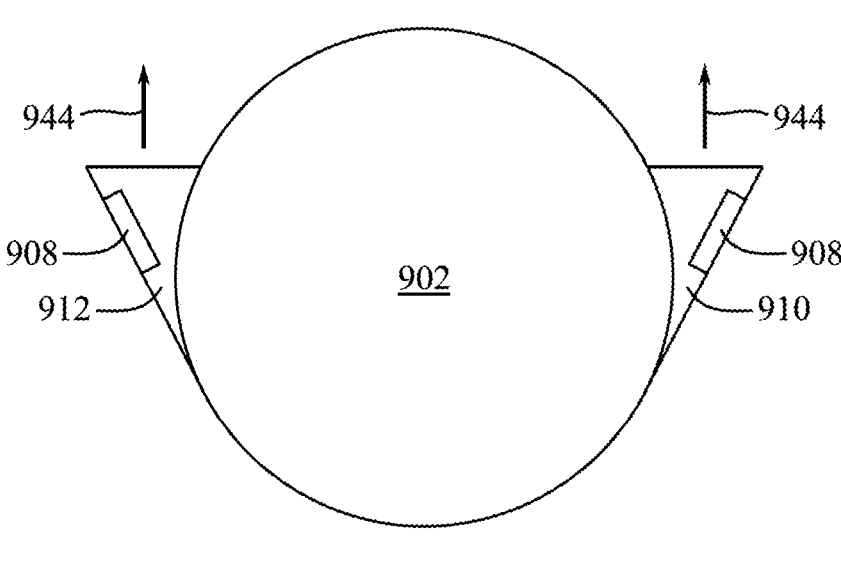
FIG. 9 shows a front view of an example of a head-mountable device worn on the head of a user.

FIG. 9 shows a front cross-sectional view of a user's head 902 with first and second load spreaders 910, 912 pressed against the sides of the head 902 by the strap 908. In the illustrated example, the load spreaders 910, 912 can be shaped such that biasing force from the variable length strap 908, or the tightening the variable length strap 908, urges the load spreaders 910, 912 upward to counteract gravity pulling the load spreaders 910, 912 and strap 908 downward over time. In the illustrated example, an outer surface of the load spreaders 910, 912 is angled such that the force vector from the strap 908 includes a vertical component 944 urging the load spreaders 910, 912 upward.

Any of the features, components, and/or parts, including the arrangements and configurations thereof shown in FIG. 9 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 9.

Figure 10:
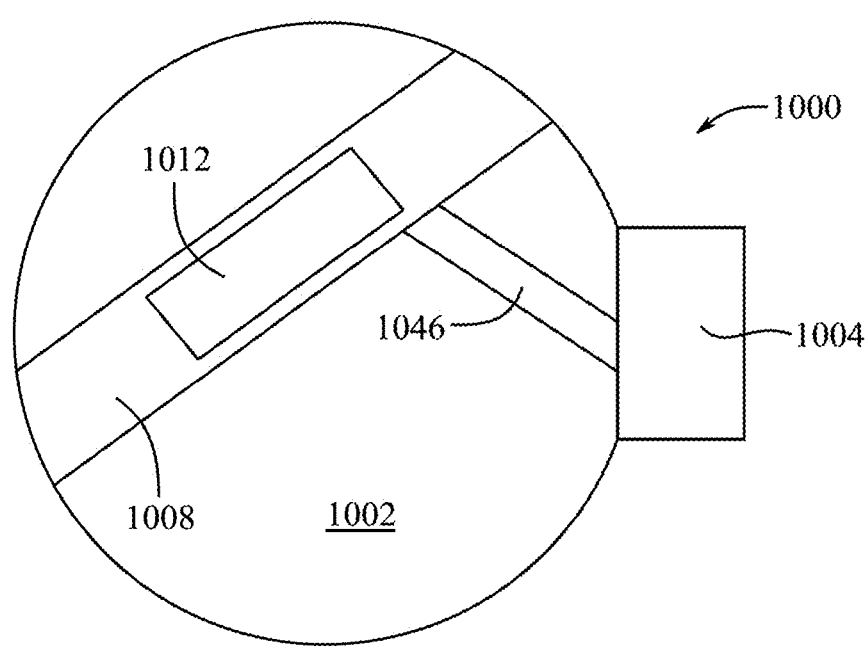
FIG. 10 shows a side view of an example of a head-mountable device worn by a user.

FIG. 10 shows an example of a head mountable device 1000 including a display component 1004 secured to a user's head 1002 via a securement band 1008. The securement band can include a load spreader 1012 similar to other load spreaders described with reference to other figures. In the illustrated example, the load spreader 1012 is configured to spread load to the right side of the user's head 1002 with the display component 1004 secured in front of the user's eyes. In the illustrated example, the display component 1004 can be secured to the securement band 1008 via a connecting member 1046. The connecting member can extend from the securement band 1008 to the display component 1004 such that the securement band 1008 is not directly connected to the display component 1004.

In this way, in at least one example, the securement band 1008 can extend all the way around the user's head 1002, for example 360-degrees around the user's head, providing space on any contact area around the head to dispose a load spreader. In the illustrated example, the load spreader 1012 is disposed on the side of the user's head 1002. In one example, a load spreader can be disposed on the front of the securement band 1008 and configured to press against the front side of the user's head in addition to the force applied on the user's face by the display component 1004. In one example, the securement band 1008 can include a load spreader on the rear side in addition to the left and right sides and the front. In the illustrated example of FIG. 10, the securement band 1008 extending completely around the user's head can provide positions of load spreaders in the front and around any point of the head to further disperse and spread the total load applied by the display component 1004 and the securement band 1008 to the user's head.

Any of the features, components, and/or parts, including the arrangements and configurations thereof shown in FIG. 70 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 10.

Figure 11A:
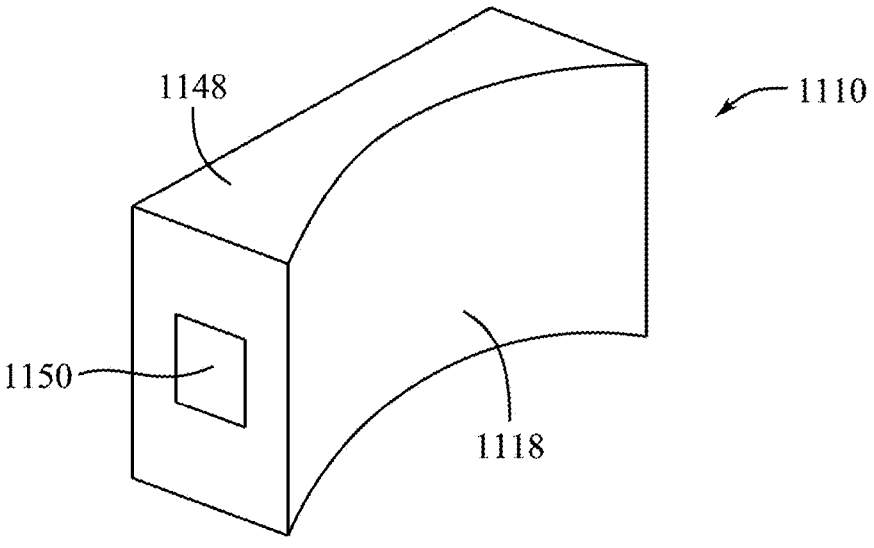
FIG. 11A shows a perspective view of an example of a load spreader.
Figure 11B:
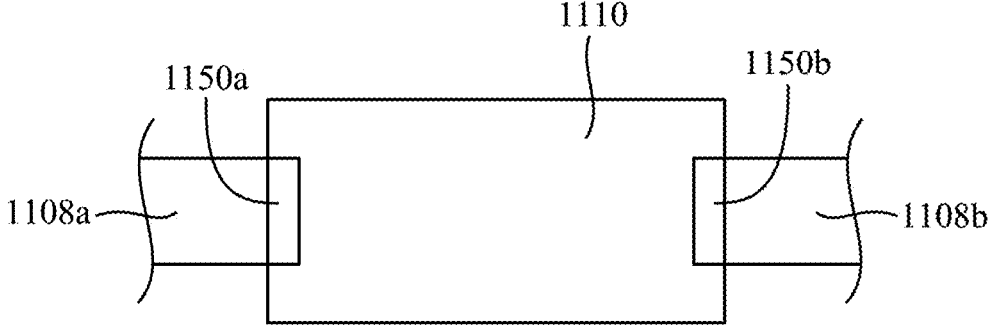
FIG. 11B shows a front view thereof.

FIGS. 11A and 11B show a perspective view and a front view, respectively, of an example of a load spreader 1110. In at least one example, the load spreader 1110 includes a body 1148 defining an outer concave surface 1118 configured to conform to the head of a user and a strap engagement feature 1150 configured to connect the load spreader to a securement strap of a wearable electronic device, such as a head-mountable device. As shown, the strap engagement feature 1150 can be positioned on either end of the load spreader 1110 and the strap sections 1108*a*, 1108*b* can be connected to corresponding strap engagement features 1150*a*, 1150*b* as shown in the top view of FIG. 11B.

The load spreader 1110 and strap 1108 can be connected as shown in any other example of load spreaders and variable length straps shown and described with reference to other figures such that the variable length strap sections 1108*a*, 1108*b* extend between and separate various load spreaders and/or load spreaders and display components. In at least one example, the strap 1108 can be removably connected to the strap engagement features 1150*a*, 1150*b* so the user can swap out straps 1108 or strap sections 1108*a*, 1108*b* as needed. The strap engagement feature 1150 can include mechanical connectors including buttons, snaps, hooks, and the like. In one example, the strap engagement feature 1150 can include magnetic components in the load spreader and/or the strap 1108 to magnetically couple the strap 1108 to the load spreader 1110.

Any of the features, components, and/or parts, including the arrangements and configurations thereof shown in FIGS. 11A-11B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 11A-11B.

Figure 12A:
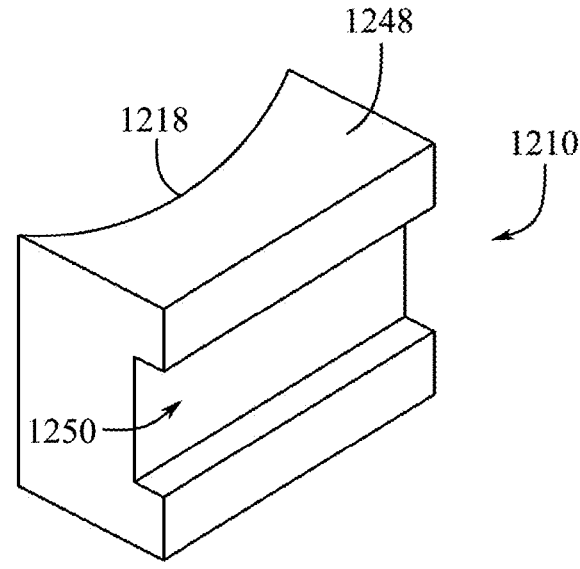
FIG. 12A shows a perspective view of an example of a load spreader.

FIG. 12A shows a perspective view of an example of a load spreader 1210 including a body 1248 defining a concave curved surface 1218 configured to press against a user's head and a strap engagement feature 1250 defined by a side of the load spreader 1210 opposite the concave curved surface 1218. In the illustrated example, the strap engagement feature 1250 includes a channel or groove formed in the body 1248 or defined by the body 1248 configured to receive a variable length securement band of a head-mountable device.

Figure 12B:
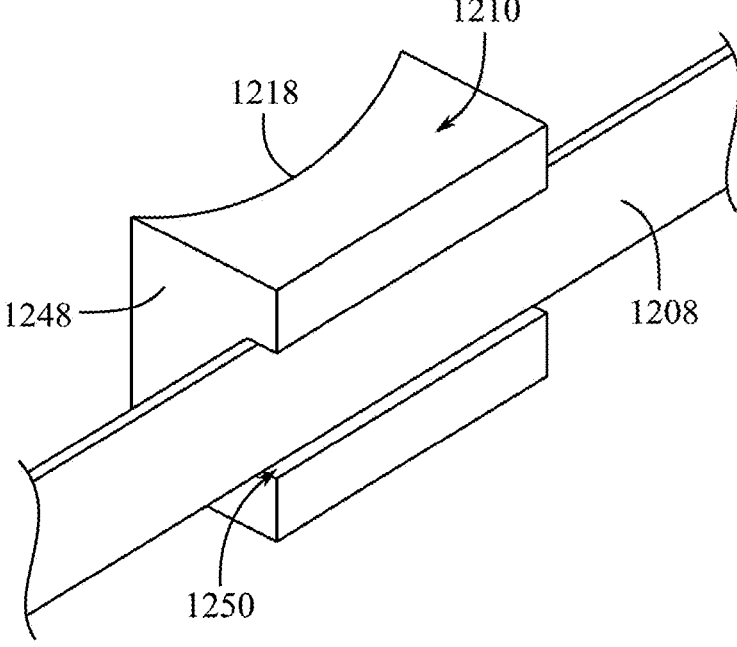
FIG. 12B shows a perspective view thereof engaged with a strap.

FIG. 12B shows another perspective view of the load spreader 1210 with a portion of a variable length securement band 1208 extending through hand partially inserted or received into the strap engagement feature 1250. The variable length strap 1208 can be removably secured within the strap engagement feature 1250 of the load spreader 1210 such that up and down shifting of the variable length securement strap 1208 is restricted by the edges or sidewalls of the groove of the strap engagement feature 1250. In this way, the variable length securement strap 1208 can rest within the strap engagement feature 1250 and press the load spreader 1210, including the concave curved surface 1218 thereof, against the user's head. The load spreader 1210 can include other strap engagement features that lock, clip, or engage with the variable length strap 1208 to secure the variable length strap 1208 within the strap engagement feature 1250 during use. The load spreader 1210 can be swapped out for another load spreader of another size, shape, or configuration to better fit unique users.

Any of the features, components, and/or parts, including the arrangements and configurations thereof shown in FIGS.

12A-12B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 12A-12B.

The foregoing description used specific nomenclature to provide a thorough understanding of the described embodiments. However, it will be apparent to one skilled in the art that the specific details are not required in order to practice the described embodiments. Thus, the foregoing descriptions of the specific embodiments described herein are only presented for purposes of illustration and description. They are not intended to be exhaustive or to limit the embodiments to the precise forms disclosed. It will be apparent to one of ordinary skill in the art that many modifications and variations are possible in view of the above teachings.

Various embodiments described herein can be improved on via the use of personal information data, gathered pursuant to authorized and well established secure privacy policies and practices that are appropriate for the type of data collected. However, the disclosed technology is not rendered inoperable in the absence of such personal information data.

It will be understood that the details of the systems and methods described above can be combined in various combinations and with alternative components. The scope of the present systems and methods will be further understood by the following claims.

What is claimed is:

1. A securement band for a head-mountable device, comprising:
   a variable length strap configured to connect to a housing of a display of the head-mountable device;
   a first load spreader connected to the variable length strap and configured to be positioned on a first side of a user's head when donning the head-mountable device, the first load spreader comprising a housing defining an internal cavity; and
   a second load spreader connected to and separated from the first load spreader by the variable length strap and configured to be on a second side of the user's head opposite the first side of the user's head when donning the head-mountable device.

2. The securement band of claim 1, wherein the variable length strap comprises a first section and a second section, the first section extending between the first load spreader and the second load spreader.

3. The securement band of claim 1, wherein the first load spreader defining a concave curved surface.

4. The securement band of claim 3, further comprising an electronic component disposed within the internal cavity.

5. The securement band of claim 3, further comprising an elastic buffer disposed on the concave curved surface.

6. The securement band of claim 5, wherein the elastic buffer comprises foam.

7. The securement band of claim 5, wherein the elastic buffer comprises a fluid-filled bladder.

8. The securement band of claim 1, wherein the variable length strap comprises an elastic material.

9. The securement band of claim 1, wherein the first load spreader and the second load spreader are rigid.

10. The securement band of claim 1, wherein the first load spreader and the second load spreader are more rigid than the variable length strap.

11. A head-mountable device, comprising:

a display;

a securement band connected to the display, the securement band comprising:

a first load spreader positioned on a first side of a user's head when donning the head-mountable device, the first load spreader defining an internal cavity;

a second load spreader positioned on a second side of the user's head when donning the head-mountable device; and a band portion connecting and separating the first load spreader and the second load spreader.

12. The head-mountable device of claim 11, wherein the first load spreader and the second load spreader each include a curved surface configured to conform to a head.

13. The head-mountable device of claim 11, wherein:

the first load spreader is configured to press against a left side of a user's head; and the second load spreader is configured to press against a right side of the user's head.

14. The head-mountable device of claim 11, wherein the band portion includes a first portion and the head-mountable device further comprises:

a third load spreader disposed between the first load spreader and the second load spreader along a length of the securement band; and a second band portion connecting and separating the second load spreader and the third load spreader.

15. The head-mountable device of claim 14, wherein:

the first load spreader defines a first concave curved surface;

the second load spreader defines a second concave curved surface; and the third load spreader defines a third concave curved surface having a curvature different than a curvature of the first concave curved surface and the second concave curved surface.

16. The head-mountable device of claim 14, wherein the third load spreader is configured to press against a rear of a user's head.

17. A load spreader, comprising:

a body comprising a housing defining:

a concave curved surface;

an internal cavity;

a strap engagement feature configured to connect the load spreader to the strap of a wearable electronic device and position the load spreader to contact a side of a user's head when donned; and an electronic component disposed in the internal cavity.

18. The load spreader of claim 17, wherein the concave curved surface comprises a curvature configured to conform to a head.

19. The load spreader of claim 17, wherein the electronic component disposed in the internal cavity comprises at least one of a speaker, a sensor, and a microphone.

\* \* \* \* \*